Patented Feb. 28, 1950

2,498,849

UNITED STATES PATENT OFFICE 2,498,849

EXTRACTION AND RECOVERY OF RUTIN

Jesse Charney, New York, N. Y., assignor to Wyeth Incorporated, Philadelphia, Pa., a corporation of Delaware No Drawing. Application July 3, 1947, Serial No. 758,993

11 Claims. (Cl. 260—210)

This invention relates to a method for the extraction and recovery of rutin, comprising extracting rutin-bearing plant material with a distillable polar solvent, adding a relatively high-boiling hydrocarbon to the extract, distilling off the polar solvent from the mixture and separating precipitated rutin from the distillation residue.

Rutin is a glucoside found in many species of plants; it has been known for about a century and its formula has been known for about fifty years. Chemically it is quercitin-$\beta$-1-1-rhamnoside-6-d-glucose.

It is only in recent years that its therapeutic value has been recognized. It has vitamin-P activity, counteracting fragility of the capillaries due to pathologic conditions or to the action of other drugs. It has been suggested for therapeutic use in such conditions as diabetes, retinal hemorrhage, apoplexy, phlebitis and the like and counteracts the adverse effect on the capillaries of salicylates, arsenicals and thiocyanates.

Because of the growing therapeutic interest in rutin and since its large-scale synthesis is not practical, methods of recovery from natural sources are important.

Rutin is found in at least 38 species of plants including tobacco, but its best source in this county is buckwheat, the Japanese and Tartarian varieties containing up to 5 percent. Rutin is present chiefly in the young green tissues of the plant. These are preferably dried soon after harvesting to secure a maximum yield.

Previous to the present invention an extensively used method of recovering rutin from buckwheat was the following:

a. Green fresh buckwheat or flash-dried buckwheat is macerated with ethanol, which may be denatured with methanol or benzene.

b. The extract is withdrawn and the extraction repeated with a fresh batch of ethanol.

c. The extract is withdrawn and the solvent distilled off from the combined extracts at atmospheric pressure.

d. The residue is extracted with benzene and the extract discarded.

e. The residue is extracted with hot water and the extract allowed to cool. Crude rutin crystallizes out and is filtered off.

f. The rutin is recrystallized from water.

Since rutin is readily oxidized, rapid extraction is preferable to slow percolation. The temperature-solubility coefficient of rutin in water is high, so that water is a favorable crystallization medium. Approximately 5.5 g. rutin is soluble in a liter of hot water, but only 135 mg. in a liter of cold water.

I have discovered that the latter part of the above process can be substantially simplified, the recovery process shortened and the yield of rutin increased.

According to my process, after extraction with alcohol (steps a and b above) and before distillation (step c), I add a volatile hydrocarbon fraction having a higher boiling point than the alcohol—e. g. a refined mineral spirit distilling substantially in the range 160°–190° C.; I then distill the mixture until alcohol and water are driven over—e. g. until the distilling liquid reaches a temperature of 110° C. The rutin, being insoluble in hydrocarbons, forms a viscous residue, from which the remaining hydrocarbon can be decanted; the decanted hydrocarbon contains dissolved in it plant resins, chlorophyll and other dark colored impurities extracted by the alcohol from the buckwheat. Because of the removal of these impurities one recrystallization of the rutin residue from water suffices.

This process has, among others, two substantial advantages over the prior process described above: (1) It provides for ready removal from the original extract of alcohol and of any water present without the danger of deleterious local overheating, since the hydrocarbon left in the still at the end of the distillation provides a liquid "cushion." (2) Distillation in the presence of the hydrocarbon fraction simultaneously effects removal of the extractant and a clean-cut separation of dark colored oil-soluble impurities from the crude rutin.

Certain variations from the procedure outlined above may be introduced without departing from the scope of my invention. For example, instead of ethanol, I may use propanol, acetone, or methyl ethyl ketone; instead of a mineral spirit fraction, I may use an aromatic solvent-naphtha fraction or other conveniently available hydrocarbon fraction having a boiling range high enough to permit clean separation by distillation of the polar solvent and preferably low enough to permit removal of residual oil by steam distillation prior to crystallization of the rutin; and instead of using water I may recrystallize the rutin from alcohol or acetone with or without the addition of water. If desired the distillation may be carried out under diminished pressure.

The following example is one embodiment of my invention; it is intended to be illustrative only and not to limit the scope of my invention which is defined in the appended claims.

Example

One kilogram of dried buckwheat leaf powder containing 2 percent rutin is extracted in a continuous extractor with 95 percent ethanol until the rutin is substantially completely removed. The extract is transferred to a roomy still provided with a simple still head in which is mounted a thermometer with bulb dipping into the liquid, and 3.5 liters of a commercially available refined mineral spirit fraction having a boiling range of substantially 160°–190° C. are added to the still. The mixture is then distilled at a moderate rate without fractionation until the liquid temperature rises to 110° C. The distillate consists of ethanol, which may be somewhat diluted with water from the buckwheat; after rectification it may be re-used for the extraction of a subsequent batch of buckwheat.

The residue is cooled to room temperature and then consists of precipitated rutin and of mineral spirit containing in solution plant resins and other dark colored oil-soluble impurities; the rutin precipitate adheres as a thick viscous residue to the walls of the still. The hydrocarbon solution is decanted and the rutin residue washed once or twice with mineral spirit; a final washing with a more volatile fraction may be given. The hydrocarbon solvent may be distilled for re-use.

Seven liters of water are then introduced into the still and brought to a boil. This dissolves the rutin and distills off adherent residual hydrocarbon. After addition of 100 g. celite or similar filter aid and 5–10 g. decolorizing carbon, the aqueous solution is filtered while still at a temperature of 90°–100° C. On cooling to room temperature pure rutin crystallizes out, is filtered off and dried. The yield is ordinarily 18–19 g. or 90–95 percent of that present in the starting material.

I claim:

1. The process of recovering rutin from rutin-bearing plant material, which comprises: extracting the plant material with a distillable polar organic solvent for rutin, distilling the extract with a distillable hydrocarbon fraction having a boiling range substantially above the boiling point of the polar solvent when in admixture with the latter, thus removing polar solvent from the distillation mixture, whereby rutin is precipitated in the distillation residue and colored oil-soluble impurities remain in solution in the hydrocarbon fraction, and recovering rutin from the distillation residue.

2. The process as defined in claim 1, in which the polar solvent is a lower aliphatic alcohol.

3. The process as defined in claim 1, in which the polar solvent is ethanol.

4. The process as defined in claim 3, in which the hydrocarbon fraction is a refined mineral oil having a boiling range of substantially 160°–190° C.

5. The process as defined in claim 1, in which the polar solvent is acetone.

6. The process as defined in claim 1, in which the recovery of rutin from the distillation residue comprises the further steps of cooling the distillation residue, separating residual hydrocarbon fraction containing dissolved impurities from the precipitated rutin, boiling the precipitated rutin in water to dissolve the rutin and drive off adherent hydrocarbon fraction, cooling the hot aqueous rutin solution, and separating crystallized rutin therefrom.

7. In a process of purifying crude rutin containing oil-soluble impurities, the steps of distilling a solution of said crude rutin in a distillable polar solvent in the presence of a distillable hydrocarbon fraction having a boiling range substantially above the boiling point of the polar solvent when in admixture with the latter, thus removing polar solvent from the distillation mixture, whereby rutin is precipitated in the distillation residue and oil-soluble impurities remain in solution in the hydrocarbon fraction, and recovering purified rutin from the distillation residue.

8. The steps as defined in claim 7, in which the polar solvent is a lower aliphatic alcohol.

9. The steps as defined in claim 7, in which the polar solvent is ethanol.

10. The steps as defined in claim 9, in which the hydrocarbon fraction is a refined mineral oil having a boiling range of substantially 160°–190° C.

11. In a process of purifying crude rutin containing oil-soluble impurities, the steps of distilling an ethanol solution of said crude rutin in the presence of a refined mineral oil having a boiling range of substantially 160°–190° C., continuing the distillation until the liquid temperature reaches approximately 110° C., cooling the distillation residue to room temperature, separating the residual oil containing dissolved impurities from the thus precipitated rutin, boiling the precipitated rutin in water to dissolve the rutin and drive off residual oil, filtering the aqueous rutin solution while at a temperature of substantially 90°–100° C., cooling the filtrate, and recovering purified crystallized rutin from the cooled filtrate.

JESSE CHARNEY.

REFERENCES CITED

The following references are of record in the file of this patent:

UNITED STATES PATENTS

| Number | Name | Date |
|---|---|---|
| 1,424,138 | Bailey et al. | July 25, 1922 |

OTHER REFERENCES

Clarke et al., J. C. S. vol. 97 (1910), Transactions Pt. 2, p. 1833–1837, 5 pages.

Sando et al., J. Biol. Chem. vol. 58 (1924), p. 737, 745, 2 pages.